United States Patent [19]

Clark

[11] 3,742,258

[45] June 26, 1973

[54] MONOSTABLE MULTIVIBRATOR WITH A LONG TIME CONSTANT AND AN AUXILIARY TRANSISTOR FOR ENSURING TURN-ON OF THE TRANSISTOR CONDUCTING IN THE STABLE STATE

[75] Inventor: Thomas E. Clark, San Mateo, Calif.

[73] Assignee: GTE Automatic Electric Laboratories Incorporated, Northlake, Ill.

[22] Filed: Aug. 23, 1971

[21] Appl. No.: 173,888

[52] U.S. Cl. .................................. 307/273, 307/288

[51] Int. Cl. .............................................. H03k 3/10

[58] Field of Search ............................ 307/273, 288; 328/207

[56] References Cited

UNITED STATES PATENTS

| | | | |
|---|---|---|---|
| 3,646,370 | 2/1972 | Lowe | 307/273 |
| 3,621,299 | 11/1971 | Barber | 307/273 |
| 3,530,314 | 9/1970 | Foerster | 307/273 |
| 3,114,049 | 12/1963 | Blair | 307/273 |
| 3,184,604 | 5/1965 | Hale | 307/273 X |
| 3,513,330 | 5/1970 | Berney | 307/273 X |
| 2,837,663 | 6/1958 | Walz | 307/273 |
| 2,827,574 | 3/1958 | Schneider | 307/273 |
| 3,407,313 | 10/1968 | Steadson | 307/273 |

*Primary Examiner*—Stanley D. Miller, Jr.
*Attorney*—K. Mullerheim, Leonard R. Cool, Russell A. Cannon et al.

[57] ABSTRACT

This monostable multivibrator includes a pair of NPN transistors arranged in the conventional manner with a capacitor connected to the collector electrode of the first transistor which conducts in the astable state, and with the capacitor and a first resistor connected to the base electrode of the second transistor which conducts in the stable state. The values of the first resistor and capacitor define the time constant that determines the time duration of operation in the astable state. The series combination of a second resistor and a third transistor which is a PNP type is connected in shunt with the first resistor, the base and collector electrodes of the third transistor being connected to the collector and base electrodes, respectively, of the second transistor. The third transistor facilitates rapid turn-on of the second transistor to terminate operation in the astable state and enables the resistance of the first resistor to be made larger than the conventional limiting value thereof that is determined by the base drive current in the second transistor and to thereby increase the time duration of the astable state.

5 Claims, 2 Drawing Figures

PATENTED JUN 26 1973 3,742,258

INVENTOR.
THOMAS E. CLARK

BY *Russell Alannar*

AGENT

MONOSTABLE MULTIVIBRATOR WITH A LONG TIME CONSTANT AND AN AUXILIARY TRANSISTOR FOR ENSURING TURN-ON OF THE TRANSISTOR CONDUCTING IN THE STABLE STATE

BACKGROUND OF INVENTION

This invention relates to multivibrators and more particularly to an improved monostable multivibrator that operates for a long time interval in the astable state.

In various timing applications a long and accurate time delay is required. It is also desirable that devices producing this time delay be reproducible without having to select and match components thereof. The prior art monostable multivibrator illustrated in FIG. 1 is one device that is employed to produce a time delay which here may be defined as the time duration of conduction in the astable state thereof. In the stable or rest state, transistor $Q_1$ is cut off and transistor $Q_2$ is saturated. In response to a timing pulse on line 10 to the collector of $Q_1$ and base of $Q_2$, this multivibrator operates in the switched or astable state with $Q_1$ conducting and $Q_2$ cut off for the time interval determined by the time constant set by resistor 11 and capacitor 12. The maximum value of resistor 11 in this prior art multivibrator for rapid turn-on of $Q_2$ is determined by the base drive current thereof required for switching conduction states of these transistors. The capacitance of capacitor 12 must therefore be increased to increase the time delay of this circuit above a limiting value set by resistor 11. Stable, low tolerance capacitors having large values of capacitance, which are required to reproducibly obtain an accurate time delay, are physically large and expensive. Tantalum capacitors, for example, which have large values of capacitance and are physically small, are high tolerance devices and therefore not suitable for use in such applications.

An object of this invention is the provision of an improved monostable multivibrator overcoming these disadvantages.

SUMMARY OF INVENTION

In accordance with this invention, a third complementary transistor is connected in the base-collector circuit of the transistor that is cut off in the astable state of a dual transistor monostable multivibrator to assure rapid turn-on of the latter transistor as the resistance in series with the base electrode thereof, which determines the duration of operation in the astable state, is increased.

BRIEF DESCRIPTION OF DRAWING

This invention will be more fully understood from the following detailed description thereof, taken in conjunction with the attached drawing in which.

DESCRIPTION OF PREFERRED EMBODIMENTS

Figure 1:
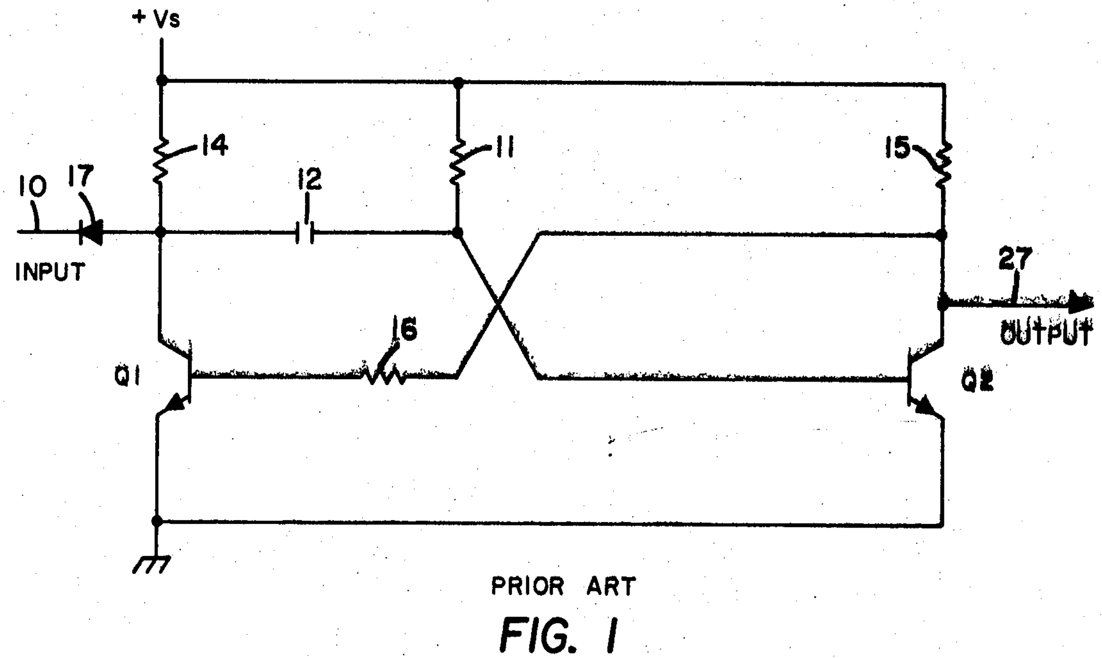
FIG. 1 is a schematic circuit diagram of a prior art multivibrator which was referred to in the discussion of the background of the invention.
Figure 2:
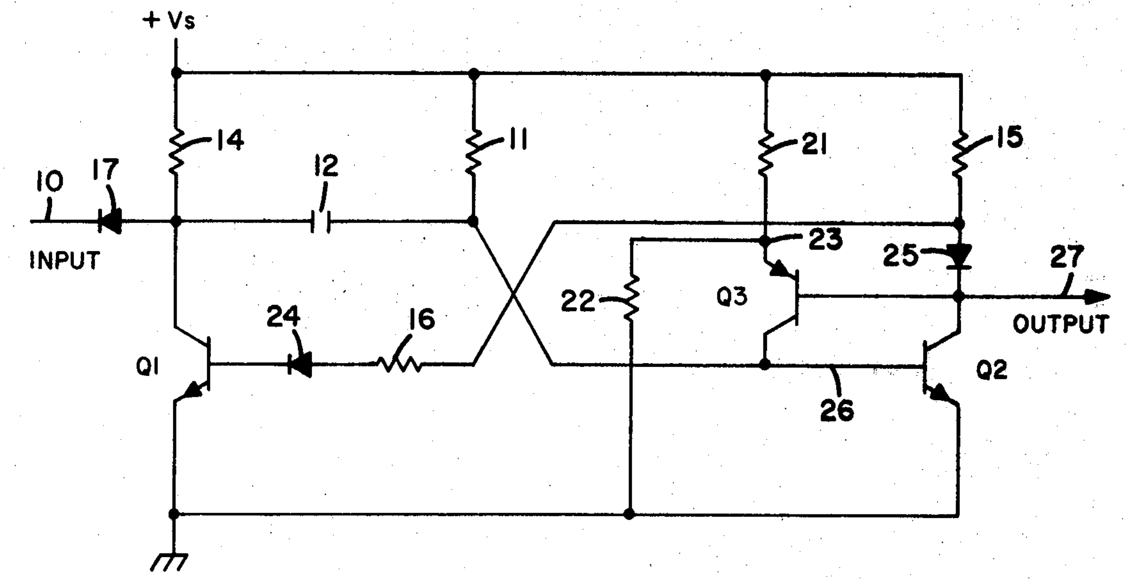
FIG. 2 is a schematic circuit diagram of a monostable multivibrator embodying this invention.

Referring now to the embodiment of this invention illustrated in FIG. 2, similar components as are employed in the conventional monostable multivibrator in FIG. 1 are designated by the same reference characters. The conventional monostable multivibrator comprises transistors $Q_1$ and $Q_2$ having associated collector resistors 14 and 15, $Q_1$ base resistor 16, input diode gates 17, and the resistor 11 and capacitor 12.

In accordance with this invention, a long time constant that determines the duration of operation in the astable state is obtained by using a resistor 11 having a resistance that is greater than the conventional limiting value thereof without increasing the capacitance of capacitor 12. This is made possible by employing a switching element in the base circuit of $Q_2$ to switch a small resistance into this base circuit to facilitate turn-on of $Q_2$ and to switch a large resistance into this base circuit when $Q_2$ is cut off and capacitor 12 is discharging. In a preferred embodiment of this invention, the switching element is a PNP transistor $Q_3$ having its collector and base electrodes connected to the base and collector electrodes, respectively, of $Q_2$. $Q_3$ may, by way of example, be a 2N2907 transistor. $Q_1$ and $Q_2$ are NPN types which may, for example, be 2N2222 transistors. Alternatively, $Q_1$ and $Q_2$ may be PNP transistors and $Q_3$ may be an NPN transistor.

A voltage divider comprising resistors 21 and 22 is connected between the supply potential $+V_s$ and ground with the emitter electrode of $Q_3$ connected to the junction 23. The values of resistors 21 and 22 are selected to bias the emitter electrode of $Q_3$ to insure that when $Q_2$ is cut off the emitter of $Q_3$ is at a low enough potential to insure that the $Q_2$ collector potential during cutoff keeps $Q_3$ turned off. $Q_3$ will saturate when the base voltage thereof is reduced to the base-emitter turn-on potential which occurs when a very small collector current is drawn by $Q_2$. The value of resistor 21 is much less than that of resistor 11. The diodes 24 and 25 provide a constant 0.7 volt drop in the base and collector circuits of $Q_1$ and $Q_2$, respectively, when these transistors are conducting. These constant voltage drops insure that the base of $Q_1$ and the collector of $Q_2$ are maintained at different potentials so they do not oscillate on and off. The output of the multivibrator is coupled on line 27 from the collector of $Q_2$, for example.

In the quiescent or rest state of the multivibrator, $Q_2$ and $Q_3$ are saturated and $Q_1$ is cut off. During this time interval, capacitor 12 charges through resistor 14 and the base-emitter junction of $Q_2$ to impress a voltage that is approximately equal to the supply potential $V_s$ across the capacitor. This takes approximately four time constants of resistor 11 and capacitor 12. When a negative trigger pulse is applied on input line 10 to the collector of $Q_1$, this transistor starts to conduct. At this instant, the voltage across capacitor 12 appears as a large negative voltage applied to the collector of $Q_3$ and base of $Q_2$ which abruptly decreases the rates of conduction thereof. The resultant voltage change in the $Q_2$ collector voltage across resistor 15 turns $Q_1$ on harder and regenerative switching action rapidly causes $Q_1$ to be saturated and $Q_2$ and $Q_3$ to be cut off.

In this astable state, $Q_3$ essentially presents an open circuit in shunt with resistor 11. Thus, capacitor 12 discharges from the potential of approximately $-V_s$ that is impressed on it toward the supply potential $+V_s$ through $Q_1$ and resistor 11 at a rate determined by the time constant of this resistor and the capacitor. When the charge voltage on capacitor 12 exceeds the ground reference potential by the base-emitter voltage drop of $Q_2$ this transistor draws very small base and collector currents, the former current being much less than that required to turn $Q_2$ on hard and the latter being much less than that required to drive $Q_1$ into cutoff. When the drop in collector voltage on $Q_2$ exceeds the base-emitter voltage drop of $Q_3$, the latter transistor immediately saturates and injects a large base drive current through the base-emitter junction of $Q_2$. This base current on line 26 drives $Q_2$ into saturation. Thus, $Q_3$ essentially amplifies the base current of $Q_2$ to provide an excess of base drive for $Q_2$ and produces sharp turn-on of the latter. Through regenerative switching action, $Q_1$ is rapidly driven into cutoff. In this manner, $Q_3$ enables $Q_2$ to turn on rapidly even when the value of resistor 11 is large, i.e., much larger than the conventional limiting value thereof for providing sufficient base drive to turn $Q_2$ on. The multivibrator continues to operate in this stable state until another trigger pulse is received on input line 10.

In an embodiment of this invention which was built and tested, $Q_1$ and $Q_2$ were 2N2222 transistors and $Q_3$ was a 2N2907 transistor. The limiting value of resistor 11 for turn-on of $Q_2$ in FIG. 1 is 86 kilohms. The resistance of resistor 11 is computed as follows. Assuming that the supply voltage $V_s = 5$ volts, and $Q_2$ has a $\beta_{min} = 20$ and collector current $I_c = 1$ mA, then the base current to saturate $Q_2$ is $$I_B = I_c/\beta_{min} = 0.05 \text{ mA}.$$

The maximum resistance of resistor 11 is then $$R_{11} = V_s - V_{BE}\ (\text{on})/I_B = 86 \text{ kilohms}.$$

In the circuit of FIG. 2, when resistor 11 had a resistance that was five times this conventional limiting value thereof, $Q_2$ still exhibited rapid and repeatable turn-on. The limiting value of resistor 11 in FIG. 2 is governed by the collector-base leakage currents in $Q_2$ and $Q_3$ which must remain small with respect to the capacitor discharge current. In this circuit in which a long time delay of 80 ms was obtained, the capacitance of capacitor 12 was maintained at less than 0.5 $\mu$F.

Although this invention is described in relation to a specific embodiment thereof, changes, modifications and improvements thereof will be obvious to those skilled in the art. By way of example, transistors $Q_2$ and $Q_3$ may be replaced with a silicon controlled rectifier (SCR) or PNPN transistor in which a terminal post is brought out from the second control or gate electrode thereof.

What is claimed is:

1. A monostable multivibrator comprising a first transistor of one type having emitter, base and collector electrodes and being nonconductive in the stable state of the multivibrator;

a second transistor of the same type having emitter, base and collector electrodes and being conductive in the stable state of the multivibrator; said first and second transistor emitter electrodes being directly electrically connected to a ground reference potential;

a power supply;

first means coupling said first and second transistor collector electrodes to said power supply;

second means coupling said second transistor collector electrode to said first transistor base electrode;

a first timing resistor connected between said second transistor base electrode and said power supply;

a timing capacitor connected between said first transistor collector electrode and said second transistor base electrode; said capacitor charging through said second transistor during conduction thereof and discharging through said first transistor during conduction of said first transistor;

third means coupling an input signal to one of said first and second transistors for causing the multivibrator to operate in the astable state; and transistor switching operating in a first state and responsive to current drawn by said second transistor in returning to operation in the stable state for operating said transistor switching means in a second state for rapidly driving said second transistor into saturation when the latter draws a base drive current that is less than the conventional turn-on current thereof.

2. A monostable multivibrator comprising a first transistor of one type having emitter, base and collector electrodes and being nonconductive in the stable state of the multivibrator;

a second transistor of the same type having emitter, base and collector electrodes and being conductive in the stable state of the multivibrator; said first and second transistor emitter electrodes being directly electrically connected to a ground reference potential;

a power supply;

first means coupling said first and second transistor collector electrodes to said power supply;

second means coupling said second transistor collector electrode to said first transistor base electrode;

a first timing resistor connected between said second transistor base electrode and said power supply;

a timing capacitor connected between said first transistor collector electrode and said second transistor base electrode; said capacitor charging through said second transistor during conduction thereof and discharging through said first transistor during conduction of said first transistor;

third means coupling an input signal to one of said first and second transistors for causing the multivibrator to operate in the astable state; and switching means responsive to current drawn by said second transistor in returning to operation in the stable state for rapidly driving said second transistor into saturation when the latter draws a base drive current that is less than the conventional turn-on current thereof;

said switching means comprising a second resistor, and a third transistor having conduction characteristics opposite to those of said other transistors, having a collector electrode DC coupled to the second transistor base electrode, having a base electrode DC coupled to the second transistor collector electrode, and having an emitter electrode connected through said second resistor to said power supply, said third transistor conducting throughout conduction of said second transistor.

3. The multivibrator according to claim 2 wherein the resistance of said second resistor is less than that of said first resistor and the resistance of said first resistor is greater than the conventional limiting value thereof.

4. The multivibrator according to claim 3 including a third resistor connected in series with said second resistor across said power supply and forming a voltage divider for biasing said third transistor.

5. The multivibrator according to claim 4 wherein said second coupling means comprises a first diode connected in series between the second transistor collector electrode and said power supply and a second diode connected between the first transistor base electrode and the side of said first diode which is spaced away from said second transistor collector electrode.

* * * * *

UNITED STATES PATENT OFFICE
CERTIFICATE OF CORRECTION

Patent No. 3,742,258 Dated June 26, 1973

Inventor(s) Thomas E. Clark

It is certified that error appears in the above-identified patent and that said Letters Patent are hereby corrected as shown below:

Claim 1, column 4, line 10, after "switching" the word -- means -- should be inserted.

Signed and sealed this 20th day of November 1973.

(SEAL)
Attest:

EDWARD M.FLETCHER,JR.
Attesting Officer

RENE D. TEGTMEYER
Acting Commissioner of Patents